US008949876B2

(12) United States Patent
Ismail et al.

(10) Patent No.: US 8,949,876 B2
(45) Date of Patent: Feb. 3, 2015

(54) METHODS AND SYSTEMS FOR CREATING AND PROVIDING COLLABORATIVE USER REVIEWS OF PRODUCTS AND SERVICES

(75) Inventors: Omar Ismail, Waterloo (CA); Erik Kalviainen, Waterloo (CA); Amanie Ismail, Waterloo (CA)

(73) Assignee: Productwiki, Inc., Waterloo, ON (CA)

( * ) Notice: Subject to any disclaimer, the term of this patent is extended or adjusted under 35 U.S.C. 154(b) by 222 days.

(21) Appl. No.: 11/689,502

(22) Filed: Mar. 21, 2007

(65) Prior Publication Data
US 2008/0235721 A1 Sep. 25, 2008

(51) Int. Cl.
H04H 60/33 (2008.01)
H04N 7/173 (2011.01)
G06Q 30/00 (2012.01)
G06Q 10/10 (2012.01)
G06Q 30/02 (2012.01)

(52) U.S. Cl.
CPC .............. *H04H 60/33* (2013.01); *G06Q 10/10* (2013.01); *G06Q 30/02* (2013.01)
USPC .............. 725/24; 725/13; 705/26.1; 705/26.7

(58) Field of Classification Search
USPC ..................................................... 725/13, 24
See application file for complete search history.

(56) References Cited

U.S. PATENT DOCUMENTS

| | | | | |
|---|---|---|---|---|
| 7,433,832 B1 * | 10/2008 | Bezos et al. | | 705/26 |
| 7,822,631 B1 * | 10/2010 | Vander Mey et al. | | 705/7.29 |
| 2003/0144922 A1 * | 7/2003 | Schrantz | | 705/26 |
| 2005/0034071 A1 * | 2/2005 | Musgrove et al. | | 715/530 |
| 2007/0179835 A1 * | 8/2007 | Ott et al. | | 705/10 |
| 2007/0244749 A1 * | 10/2007 | Speiser et al. | | 705/14 |
| 2007/0244888 A1 * | 10/2007 | Chea et al. | | 707/6 |
| 2008/0071602 A1 * | 3/2008 | Ojakaar et al. | | 705/10 |
| 2008/0244431 A1 * | 10/2008 | Chea et al. | | 715/764 |
| 2008/0288534 A1 * | 11/2008 | Reid et al. | | 707/103 R |

* cited by examiner

Primary Examiner — Ricky Chin
(74) Attorney, Agent, or Firm — Sawyer Law Group, P.C.

(57) ABSTRACT

Methods, systems, and user-interfaces for creating a collaborative review of an offering may facilitate multiple people (users) collaborating on a review by submitting short statements concerning particular characteristics, traits, or qualities concerning the offering. Users can also vote on the validity or strength of each submitted statement. Votes on statements are tabulated, scores are computed, and the information is fed back to the user. These actions take place over a network with users of computing devices interacting with the system running on one or more servers. In one embodiment, the end results of this process is a single collaborative review for each offering that reflects the experiences, knowledge, and understanding of multiple people concerning that offering. The collaborative review may be made accessible via a network as a useful resource for people in making decisions about that offering.

14 Claims, 9 Drawing Sheets

Nintendo Wii — 401

Collaborative Review

402a — Pros:                                                                Do you agree? — 405a 403a — Controller is innovative and allows for new kinds of games          +4
Very small and elegant looking                                              +4
Integrated Web browser with flash support                                  +2 — 406a
Fully backwards compatible with all Gamecube games                         +2 — 406b
Virtual Console has a ton of classic games                                 +2 — 406c
403b — Integrated wireless connection                                       0 — 406d
It is really awesome, trust me.                                           -2
                                                                              — 405b
402b — Cons:                                                              Do you agree?

No HD resolution (limited to max 480p)                                    +3
No ethernet port included                                                  +3
Virtual console games are too expensive                                    +2
Component cables are difficult to find                                     +1
Less powerful than Xbox 360 and PS3                                        -1
Controller is jumpy                                                        -2 see how people voted »

— 407
404 — Do you have a point that you would like to add to the review?
Type an important point that is missing above. Try to be      ⊙ Pro  [Submit]
concise. (5-20 words)                                         ○ Con » learn more about collaborative reviews
                                                                              — 408

*Fig. 4A*

Nintendo Wii

Collaborative Review

Fully backwards compatible with all Gamecube games     +2 👍 👎

| | | | |
|---|---|---|---|
| 03/15/07 3:32 PM | Omar | submitted | [filter] |
| 03/15/07 3:32 PM | Omar | (+) agreed | [filter] |
| 03/15/07 3:34 PM | Erik | (-) disagreed | [filter] |
| 03/15/07 3:35 PM | Reviewer | (+) agreed | [filter] |
| 03/15/07 3:38 PM | Adam | (+) agreed | [filter] |

Virtual Console has a ton of classic games     +2 👍 👎

| | | | |
|---|---|---|---|
| 03/15/07 3:32 PM | Omar | submitted | [filter] |
| 03/15/07 3:32 PM | Omar | (+) agreed | [filter] |
| 03/15/07 3:34 PM | Erik | (+) agreed | [filter] |
| 03/15/07 3:34 PM | Reviewer | (-) disagreed | [filter] |
| 03/15/07 3:38 PM | Adam | (+) agreed | [filter] |

Integrated wireless connection     0 👍 👎

| | | | |
|---|---|---|---|
| 03/15/07 3:31 PM | Omar | submitted | [filter] |
| 03/15/07 3:31 PM | Omar | (+) agreed | [filter] |
| 03/15/07 3:38 PM | Adam | (-) disagreed | [filter] |

It is really awesome, trust me.     -2 👍 👎

| | | | |
|---|---|---|---|
| 03/15/07 3:39 PM | Adam | submitted | [filter] |
| 03/15/07 3:39 PM | Adam | (+) agreed | [filter] |
| 03/15/07 3:39 PM | Reviewer | (-) disagreed | [filter] |
| 03/15/07 3:39 PM | Erik | (-) disagreed | [filter] |
| 03/15/07 3:39 PM | Omar | (-) disagreed | [filter] |

*Fig. 4B*

Nintendo Wii

Collaborative Review

No HD resolution (limited to max 480p)     +3 👍 👎
  03/15/07 3:35 PM   Reviewer   (+) agreed   [remove filter]

Component cables are difficult to find     +1 👍 👎
  03/15/07 3:35 PM   Reviewer   (-) disagreed   [remove filter]

Less powerful than Xbox 360 and PS3     -1 👍 👎
  03/15/07 3:35 PM   Reviewer   (-) disagreed   [remove filter]

Controller is jumpy     -2 👍 👎
  03/15/07 3:35 PM   Reviewer   (-) disagreed   [remove filter]

METHODS AND SYSTEMS FOR CREATING AND PROVIDING COLLABORATIVE USER REVIEWS OF PRODUCTS AND SERVICES

FIELD OF THE INVENTION

The present invention relates to internet services and product reviews. In particular, the present invention relates to methods and systems for creating and providing collaborative user reviews of products and services.

BACKGROUND OF THE INVENTION

Reviews by people concerning offerings (eg. consumer products, services) are helpful to other people in determining the quality and/or nature of the offering. This information can be used in making a decision about that offering. The Internet is a powerful platform for writing and publishing such reviews. Subsequently, there exist multiple reviews from different people providing different viewpoints concerning each particular offering. While having multiple viewpoints is helpful, users must extract the unique benefits and drawbacks from various scattered sources of information to form an opinion. This process is time-consuming and challenging and must be repeated by each user researching an offering. Also, since reviews are static, they can become outdated and irrelevant. Most Internet users do not write reviews because it can be challenging; writing reviews is time-consuming, and reviewers often repeat points that have already been stated. From the above it is seen that a new method for reviewing an offering is needed.

SUMMARY OF THE INVENTION

The present invention relates to methods, systems, and user-interfaces for creating a collaborative review of an offering. Multiple people (users) can collaborate on a review by submitting short statements concerning particular characteristics, traits, or qualities concerning the offering. Users can also vote on the validity or strength of each submitted statement. Votes on statements are tabulated, scores are computed, and the information is fed back to the user. These actions take place over a network with users of computing devices interacting with the system running on one or more servers. In one embodiment, the end result of this process is a single collaborative review for each offering that reflects the experiences, knowledge, and understanding of multiple people concerning that offering. The collaborative review may be made accessible via a network as a useful resource for people in making decisions about that offering.

In one aspect, the present invention relates to a method for creating a single collaborative review of a product or service offering. In one embodiment, a method includes: receiving a textual statement from a user concerning a first aspect of the quality of an offering; receiving a plurality of votes from other users, each of the received votes comprising one of agree and disagree; creating a score for the statement based on the received votes; and displaying to a viewer the statement, and an indication of its score.

In a second aspect, the present invention relates to systems for creating collaborative reviews of a product or service offering. In one embodiment, a system comprises: a web server which transmits a web page for receiving a textual statement from a user concerning a first aspect of the quality of an offering, and transmits a web page for receiving a plurality of votes from other users, each of the received votes comprising one of agree and disagree; a database, in communication with the web server, which stores the textual statement and received votes in a memory element; and a data processor, in communication with the database, which creates a score for the textual statement based on a number of received votes associated with the statement; wherein the score is displayed in a web page associated with the offering along with the textual statement.

In a third aspect, the present invention relates to user displays for providing a single collaborative review of an offering, the review created using input provided by a plurality of users. In one embodiment, a user display comprises: an identification of an offering; a statement associated with the offering, the statement having been previously provided by a user and retrieved from a memory element; and an indication of a score associated with the statement, the score created in response to input provided by other users in response to the statement.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1A:
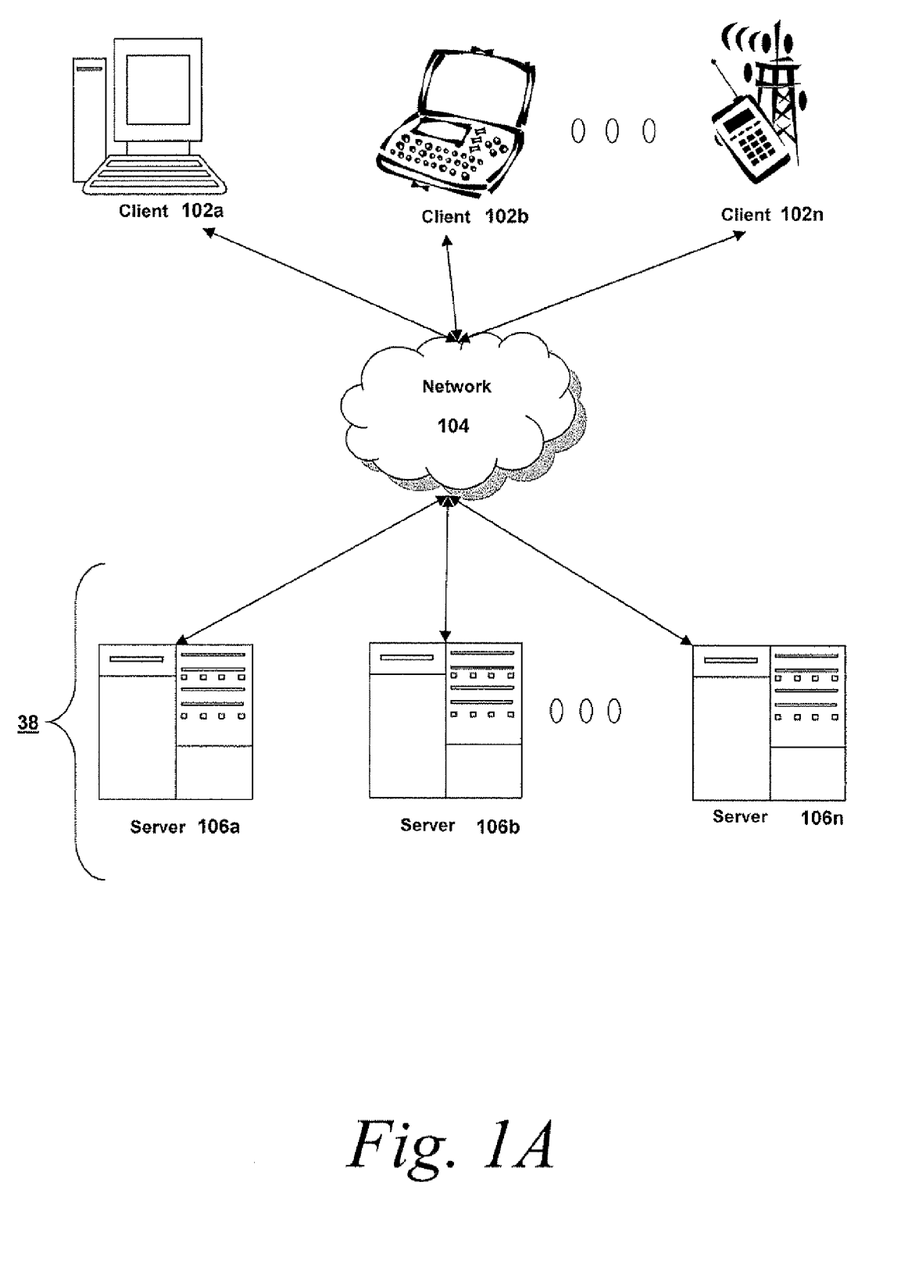
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks. The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 may have the capacity to function as either an application server or as a master application server. In one embodiment, a server 106 may include an Active Directory. The remote machine 30 may be an application acceleration appliance. For embodiments in which the remote machine 30 is an application acceleration appliance, the remote machine 30 may provide functionality including firewall functionality, application firewall functionality, or load balancing functionality. In some embodiments, the remote machine 30 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n. In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node.

In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106b hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application.

In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the MICROSOFT WINDOWS Terminal Services manufactured by the Microsoft Corporation.

In another embodiment, the application is an ICA client, developed by Citrix Systems, Inc. of Fort Lauderdale, Fla. In still another embodiment, the server 106 may run an application, which for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash. In one embodiment, the server 106 includes a policy engine for controlling and managing the access to, selection of application execution methods and the delivery of applications. In another embodiment, the server 106 communicates with a policy engine.

In some embodiments, the policy engine determines the one or more applications a user or client 102 may access. In other embodiments, the policy engine determines how the application should be delivered to the user or client 102, e.g., the method of execution. In still other embodiments, the server 106 provides a plurality of delivery techniques from which to select a method of application execution, such as a server-based computing, application streaming, or delivering the application locally to the client 102 for local execution.

In one embodiment, a client 102 requests execution of an application program and a server 106 selects a method of executing the application program. In another embodiment, the server 106 receives credentials from the client 102. In still another embodiment, the server 106 receives a request for an enumeration of available applications from the client 102. In yet another embodiment, in response to the request or receipt of credentials, the server 106 enumerates a plurality of application programs available to the client 102.

In some embodiments, the server 106 selects one of a predetermined number of methods for executing an enumerated application, for example, responsive to a policy of a policy engine. In one of these embodiments, an application delivery system on the server 106 makes the selection. In another of these embodiments, the server 106 may select a method of execution of the application enabling the client 102 to receive output data generated by execution of the application program on a server 106b. In still another of these embodiments, the server 106 may select a method of execution of the application enabling the client 102 to execute the application program locally after retrieving a plurality of application files comprising the application.

In yet another of these embodiments, the server 106 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106.

Figure 1B:
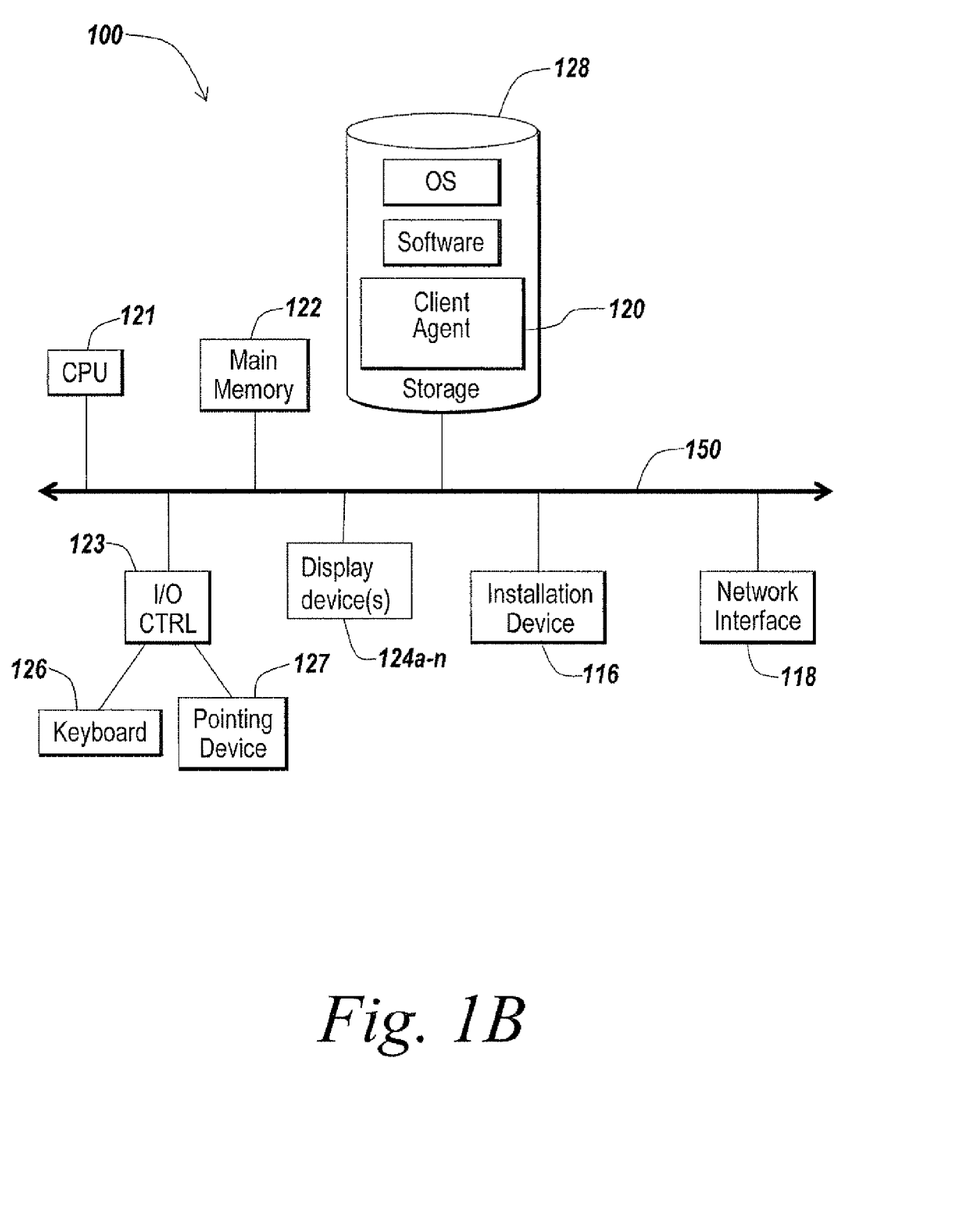
FIGS. 1B and 1C are block diagrams depicting embodiments of computers useful in connection with the methods and systems described herein.
Figure 1C:
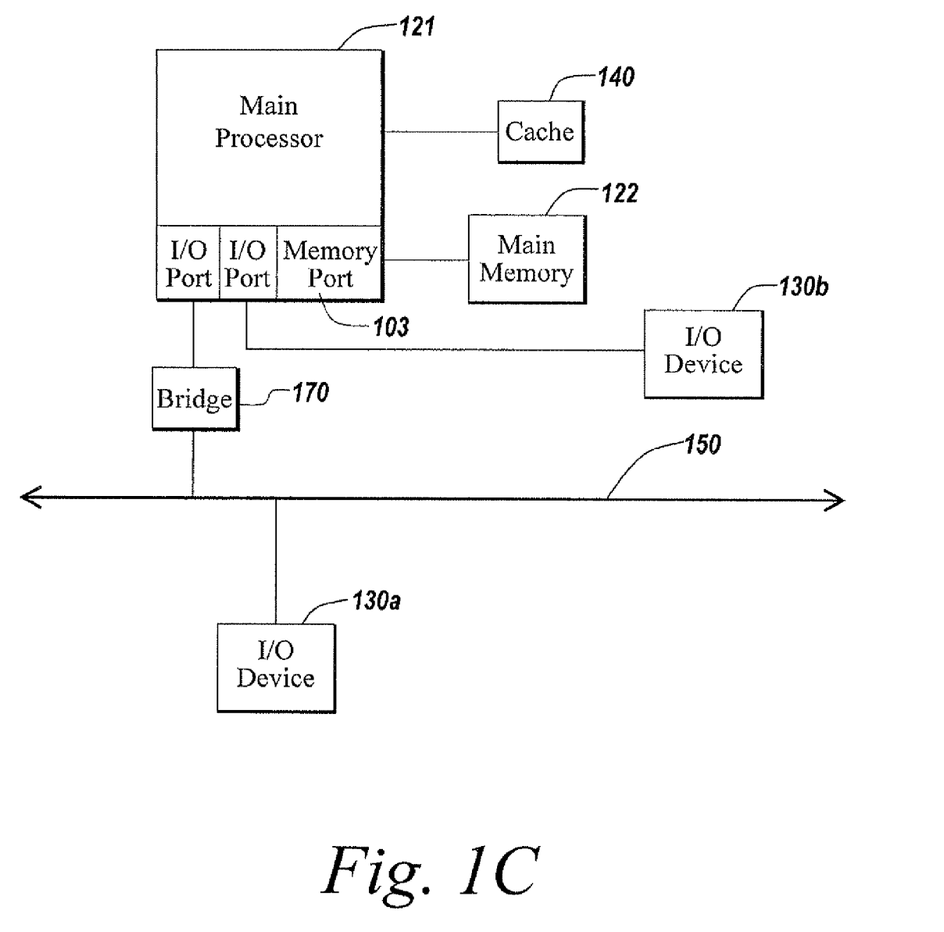

In one embodiment the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio. The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130b (generally referred to using reference numeral 130), and a cache memory 140 in communication with the central processing unit 121. The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM. FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCIExpress bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n.

In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In some embodiments, the computing device 100 may have different processors, operating systems, and input devices consistent with the device. For example, in one embodiment the computing device 100 is a Treo 180, 270, 600, 650, 680, 700 p or 700 w smart phone manufactured by Palm, Inc. In some of these embodiments, the Treo smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, a server 106 communicates with a policy engine to determine whether a client 102 may access a requested resource. In one of these embodiments, the server 106 collects information about the client 102 and transmits the information to the policy engine for use in making an access control decision. In another of these embodiments, the policy engine collects the information about the client 102. In still another of these embodiments, a collection agent gathers the information about the client 102 and transmits the information to the policy engine, which makes an access control decision.

Figure 2:
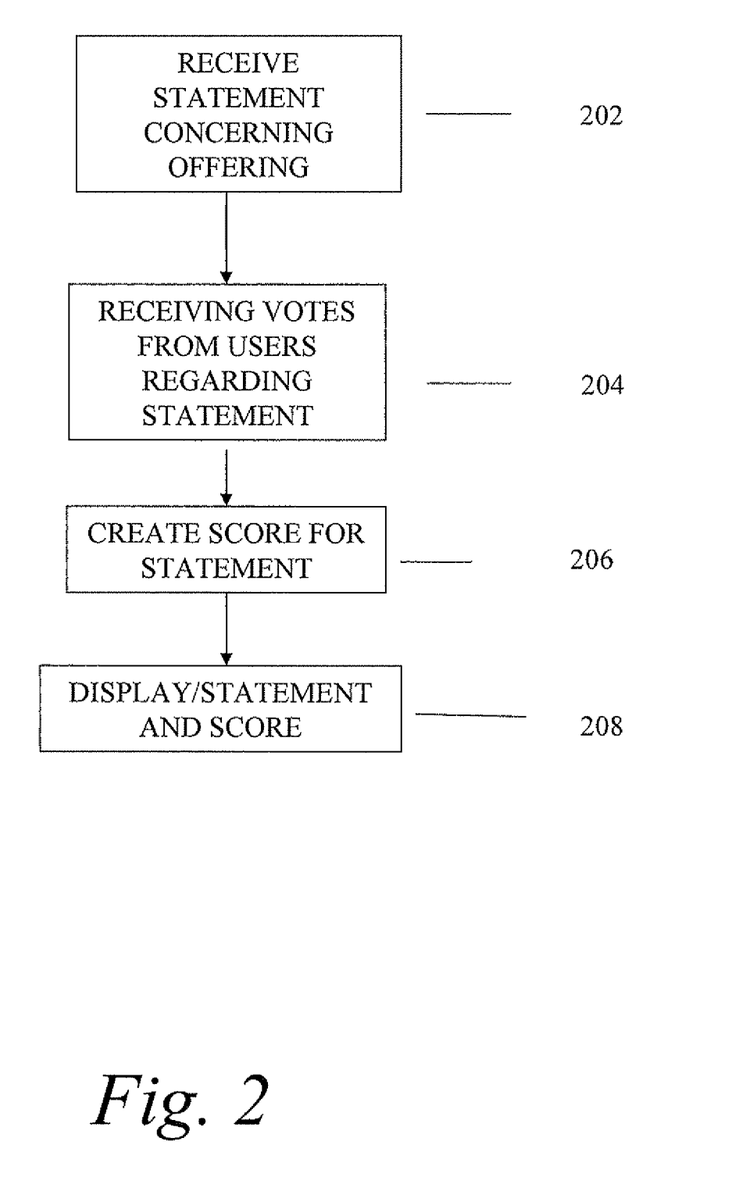
FIG. 2 is a flow diagram depicting one embodiment of a method for creating a collaborative review of an offering.
Figure 4A:
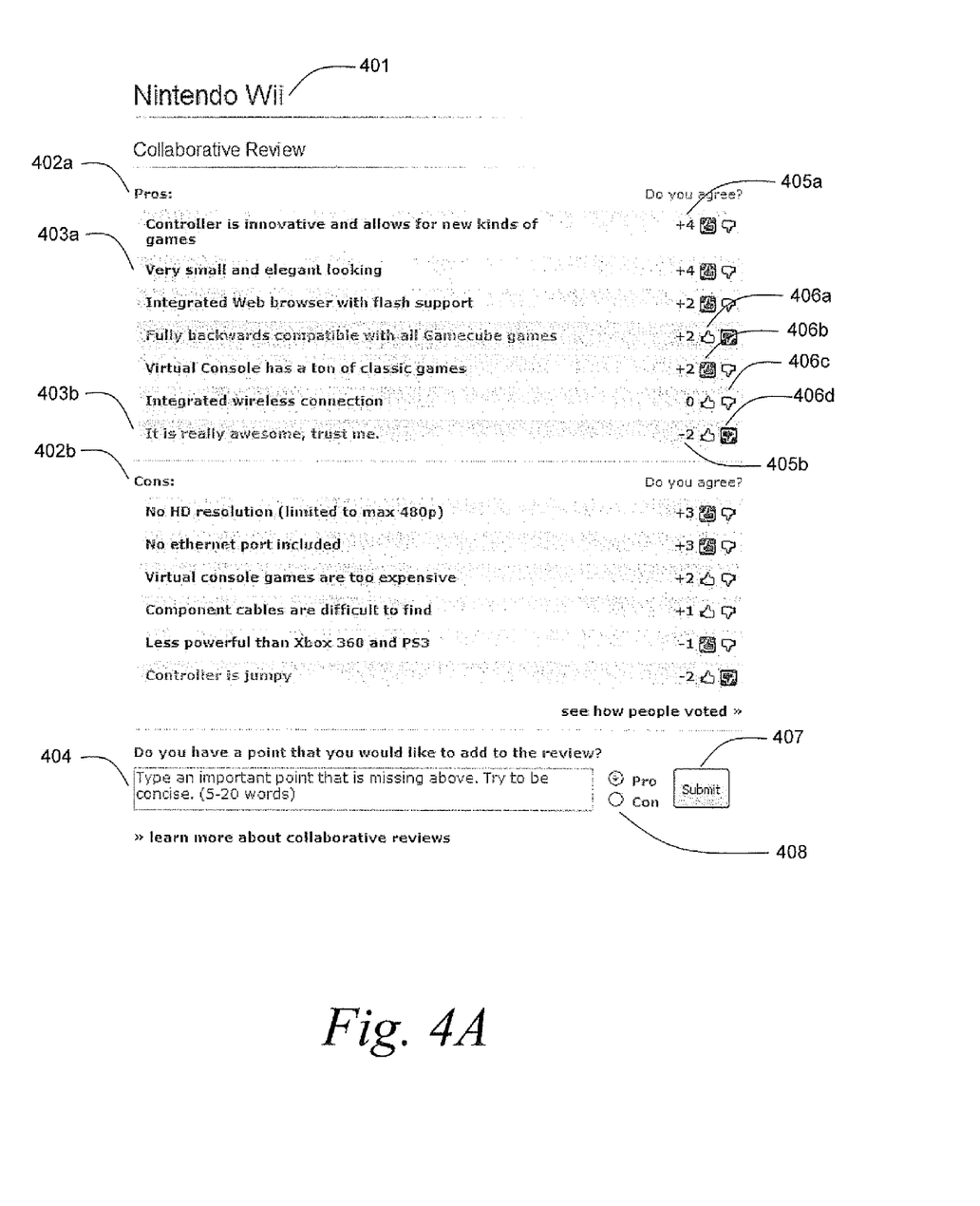
FIGS. 4A-4D are example screenshots of one embodiment of a user display used in a collaborative review system.

A collaborative review may be created through the submission of, voting on and display of a set of one or more short statements regarding an offering by one or more users over a network 104. In one embodiment, an offering is a consumer product. In another embodiment, an offering is a service provided by a person or an organization such as a businesss. In another embodiment, an offering is the work done by an author, filmmaker, or musician. A set of statements may be created by the process of receiving, voting on, and displaying individual statements. FIG. 2 demonstrates the method of creating one single statement as part of a collaborative review. This process may be repeated for any number of subsequent statements, which can form the basis for a single collaborative review. FIG. 4A-D demonstrate several embodiments of the graphical interface of a collaborative review of a unique offering referred to by a descriptive title 401 of the offering. For example, FIG. 4A shows examples of particular statements 403a-b as part of a collaborative review.

Referring now to FIG. 2, an embodiment of a method for creating one statement as part of a collaborative review is depicted. A collaborative review is made up of one or more of such statements. In brief overview, a statement is received concerning an offering (step 202) from a single client 102 via the network 104 and transmitted to a server 106. Other clients 102 may vote on the statement (step 204) via the network 104, and each vote is transmitted via network 104 and stored on a server 106. Based on the votes 204 submitted a score is created for each statement 206. Both the statement and its score are displayed 208 to the client 102, with the information being transmitted over the network 104 sent from the server 106. For example, FIG. 4A shows a set of statements 403 on the left displayed along with their associated scores 405a-b on the right.

A statement can be received 202 in a variety of ways, wherein a user (represented by client 102) provides textual input via their computing device 100. In some embodiments, a user enters textual information via an input device connected to their computing device 100. In one of these embodiments, the input device is a computer keyboard that transmits information to the client 102 that relays the text data to the server 106 via the network 104. In another one of these embodiments, the input device is a computer mouse that the user manipulates to enter text using an interface on a computer screen. In another one of these embodiments, the input device is a microphone that records the user's voice. In another one of these embodiments the input device is a touch screen display connected to the client 102 in which the user inputs text information by touching the screen with a finger or stylus.

In some embodiments, a statement is received concerning an offering 202 by a user interacting with a web interface using Internet browser software. Examples of Internet browsers include Microsoft Internet Explorer, Mozilla Firefox, Safari (made by Apple, Inc.), and Opera. In one of these embodiments the text is input to a single line text box embedded in a web page. In another one of these embodiments the text is input to a multiple line text area. For example, FIG. 4A shows a two-line input box 404 for receiving a user comment. In some embodiments, the textual data is submitted to the server 106 initiated by a click of a mouse on a button in the web page. For example, FIG. 4A shows an example of a button 407 that, when clicked, submits the textual data to a server. In another embodiment, the textual data is submitted by a keypress on a computer keyboard.

In some embodiments, a statement is received concerning an offering 202 by a user on a mobile device. Examples of mobile devices include the Apple iPhone, RIM Blackberry 8800, and Motorola Q. In one of these embodiments text is input by a user entering characters through the mobile device's keypad. In another embodiment, text is input by a user interacting with the mobile device's touch screen with their finger or stylus. In another embodiment, a statement is received by a user speaking into the mobile device's microphone.

In some embodiments, the user categorizes the statement before it is submitted. In some of these embodiments, the user makes a choice from a predetermined list of statement categories. Examples of statement categories include, but are not limited to, "pro" and "con". In one of these embodiments, the user selects the statement category using a radio button input element on their computing device 100. For example, FIG. 4A shows a radio button 408 with both "pro" and "con" options, with "pro" being selected in this case. Similarly, in another embodiment, the user selects the statement category using a dropdown list. In other embodiments, the user categorizes a statement with text input through a text input interface element on the computing device 100. The categorization of a statement is not necessarily required to be done before a statement is submitted to the server. In some embodiments, the categorization of a statement happens after the statement has been submitted. In some embodiments, the categorization of a statement is not done by the original submitter of the statement, but rather by a third party. An example of this is when a user submits a statement that is then later categorized by a moderator of a website.

In some embodiments, the length of the statement text is limited to a finite number of characters or words. For example, this limit could be set at one hundred characters of text. In one of these embodiments, the user is presented with a message explaining that the statement text is too lengthy after the user has attempted to input a statement with more characters than the maximum character limit.

Figure 4B:
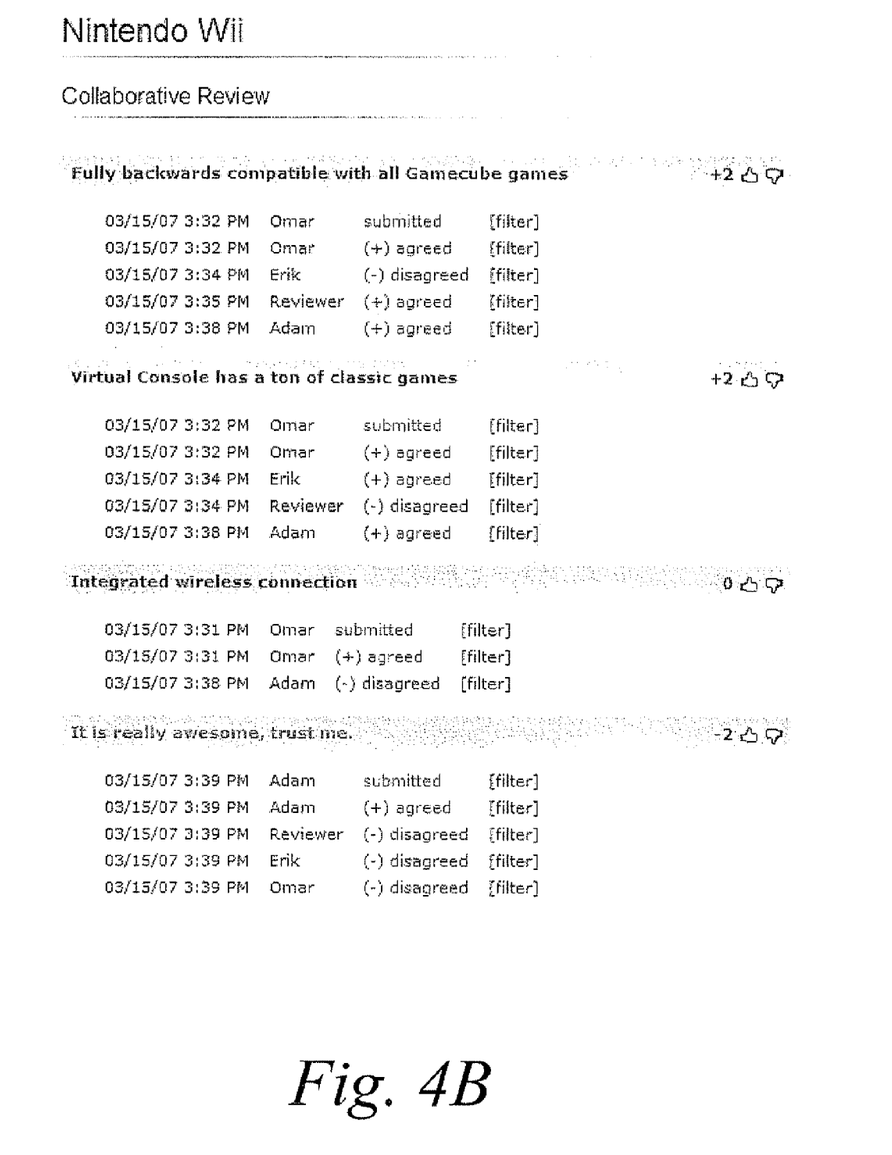
Figure 4C:
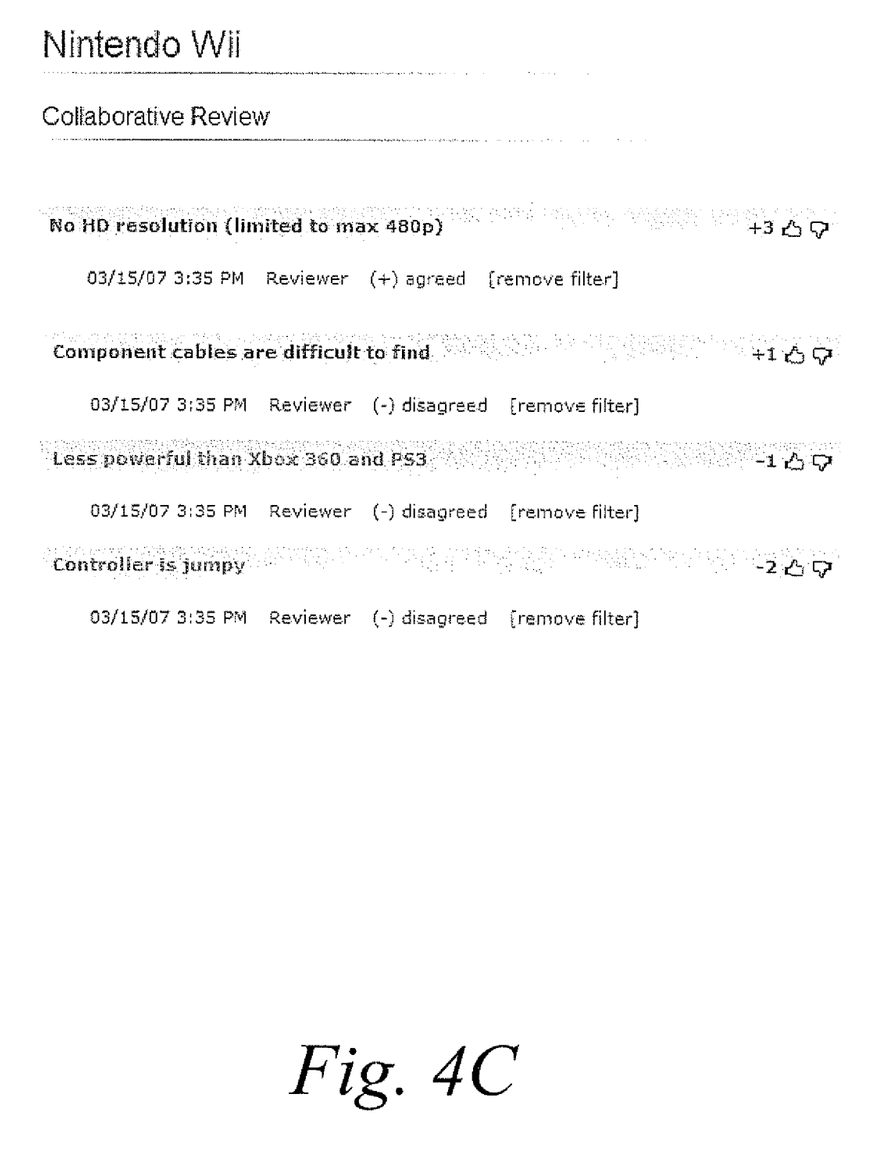
Figure 4D:
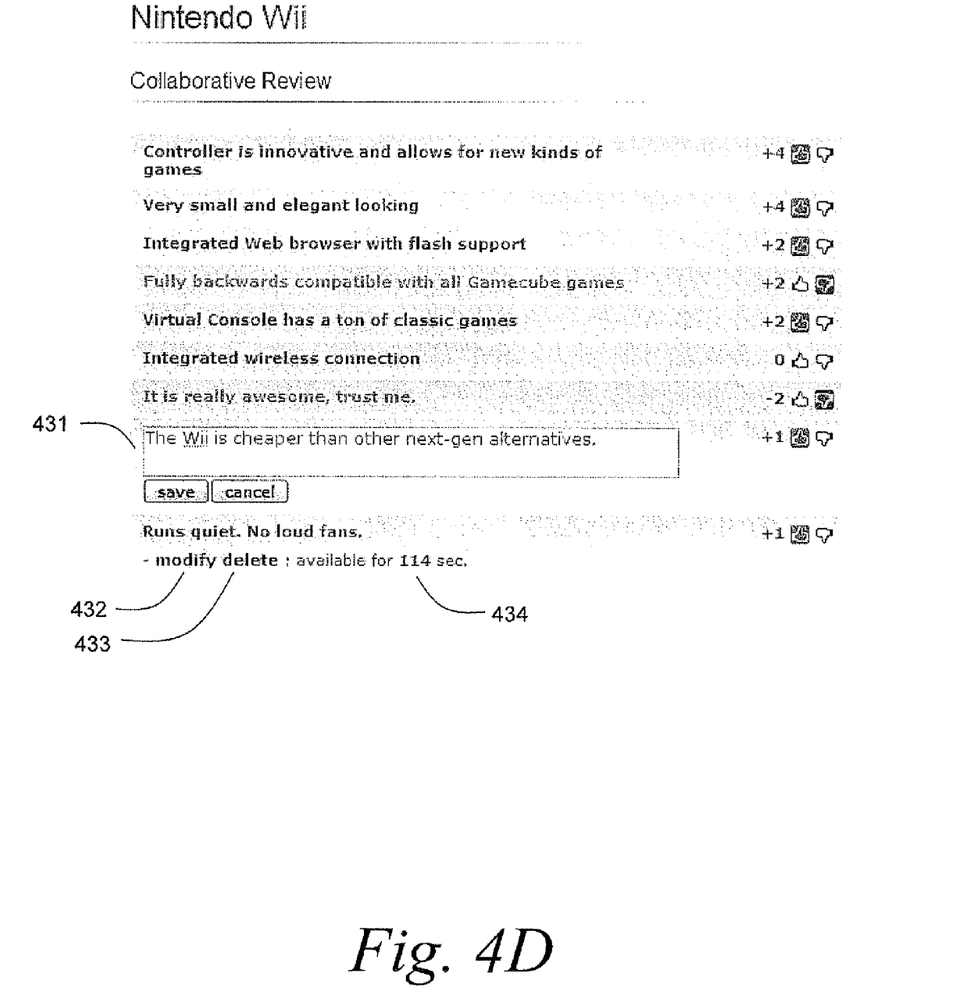

In some embodiments, users are presented with an interface to modify or delete statements after they have been submitted to the server 106. In one of these embodiments, the user who submitted the statement is able to modify or delete the statement within a limited time frame. For example, FIG. 4D demonstrates a situation where the user has one hundred and fourteen seconds 434 remaining to modify 432 or delete 433 a statement that they have submitted, after which that ability is revoked. FIG. 4D also shows a multi-line text box 431 where the user has the ability to modify the original statement. In other embodiments, certain designated users, known as moderators, have special privileges, able to modify or delete any statement regardless of who submitted it and when.

For each offering, one or more users vote regarding a statement 204 using their computing device 100 as a client 102 on the network 104 by interacting with server 106. In some embodiments, a user will choose whether or not they agree with (a positive assertion of) or disagree with (a negative assertion of) the statement. In one of these embodiments a vote is cast as to whether the user agrees or disagrees with the statement by a mouse click on a user interface element. Examples of interface elements are images, icons, text elements, links, checkboxes, radio buttons, and buttons. In another embodiment, the user votes on a statement by speaking into a microphone that gets interpreted either as agree or disagree. In another embodiment a user may cast a vote by touching a touch-screen display with a finger or a stylus.

The semantics of the vote regarding a statement does not necessarily have to be presented explicitly as agree or disagree. In some embodiments, the choice of votes is presented by a graphical element. Examples of possible graphical elements include checkboxes, an "X", a "thumbs up" image, a "thumbs down" image, a "plus" sign, a "minus" sign, an "up arrow", and a "down arrow". For example, FIG. 4A. shows a choice of votes by either a "thumbs up" image 406$a$-$b$ to represent an agree vote, and a "thumbs down" image 406$c$-$d$ to represent a disagree vote. In other embodiments, the semantics of the vote are presented with words or short phrases other than agree or disagree. Examples of such words or phrases include "Yes", "No", "Yay", "Nay", "Up", "Down", "Plus", "Minus", "Positive", "Negative", "Good", "Bad", "I agree" and "I disagree".

Votes on statements may be cast in different ways. In some embodiments the user assigns a numerical score that represents their vote on a statement. In some embodiments, the user is asked to select from a set of numerical choices using a user interface element concerning their vote. Examples of user interface elements include drop down lists, radio buttons, a set of buttons, and a set of links. In other embodiments, the user indicates their vote by a choice of an appropriate image, piece of text, or button. For example, the user may use a mouse click to select an image of a "star" to give a statement a vote, or rating, of 4 out of 5.

In some embodiments, users vote on more than one aspect of a statement. In one embodiment, the user may vote both on whether or not they agree with the validity of a statement, and simultaneously vote on the relative importance of a statement in the context of an offering. For example, a statement can be valid ("The Earth is spherical"), but not important to the review, and thus voted as "agree", and "not important".

A user may implicitly or explicitly choose to abstain from voting regarding the statement. In some embodiments, users may be explicitly presented with a choice to express their non-vote. In one of these embodiments a user expresses their non-vote by a mouse click on an interface element on their computing device 100.

In some embodiments, a user may modify their original vote. For example, if they originally had voted as "agree" they may then change their vote to "disagree". In one of these embodiments, the user changes their vote by a mouse click on a user interface element. In some embodiments a user may retract their original vote. In one of these embodiments, the user retracts their vote by a mouse click on the same interface element that they had clicked when they first cast their vote. Votes may be changed any number of times in such a way.

In some embodiments, the user is provided with feedback as to how they have voted. In one of these embodiments, a user interface element will change state indicating that a vote has been cast. If a vote has not been cast on an element, it is considered in an "off" state, and after a vote has been cast it changes to an "on" state. For example, an image depicting an agree vote will change color after a user has cast an agree vote on that statement. FIG. 4A. depicts a situation in which the voting interface element 406$a$-$d$ changes state depending on the status of a user's vote. In this example, agree element 406$a$ and disagree element 406$c$ demonstrate the "off" state of the interface element. Agree element 406$b$ and disagree element 406$d$ demonstrated the "on" state of the interface element. In this example, the "on" state is differentiated by a noticeable darker color used in the rendering of the interface element. This state change happens for all types of votes including agree, disagree, and abstain. In some embodiments, the visual characteristics of the display of the statement itself will change once a vote is cast. In one of these embodiments, the background color of the statement text indicates that a vote was cast on that statement. For example, the background color of a statement could turn a grey color once a "disagree" vote is cast. Another example, would be that the background color of a statement could turn a blue color when an "agree" vote is cast.

In some embodiments, the submission of a statement 202 is interpreted as a vote of the statement. In one embodiment, the submission of a statement is interpreted as an "agree" vote regarding that statement from that user. In another embodiment, the submission of a statement does not explicitly count as a vote from the user, but the user still has the ability to cast a vote on that statement.

For the purpose of presenting the relative weight, or validity of a statement a score must be calculated for the statement 206. The computed score for a particular statement depends on the votes cast and, in some embodiments, on the quality of the user who cast the vote. In some embodiments, the calculation of a score employs a mathematical algorithm that takes into consideration the history of the votes previously cast by users. In one embodiment the score is calculated by subtracting the sum of the disagree votes from the sum of the agree votes. For example, if a particular statement received 18 "agree" votes and received 12 "disagree" votes, the statement's score would be equal to 6, determined by computing the expression (18-12). Conversely, in one embodiment, the sum of "agree" votes is subtracted from the sum of "disagree" votes.

In other embodiments each vote is multiplied by a number representing the authority of the user before it is summed to come up with a weighted score. In this embodiment each user who has cast a vote has an associated weight that will be used in the calculation of the score for that statement. For example, if three users with respective weight values of (3, 8, 5) cast "agree" votes regarding a statement, and 4 users with respective weight values of (1, 3, 2, 4) cast "disagree" votes, the score would be computed as equaling 6, determined by computing the expression ((3+8+5)−(1+3+2+4)). Conversely, in another embodiment the weighted score is determined by subtracting the sum of weighted "agree" votes from the sum of weighted "disagree" votes.

In some embodiments, the mathematical algorithm used to compute a statement's score depends on the ratio of "agree" and "disagree" votes. In one embodiment, the score is computed by dividing the sum of agree votes by the sum of disagree votes. For example if a particular statement received 18 "agree" votes and received 12 "disagree" votes, the statement's score would be equal to 1.5, determined by computing the expression (18/12).

In some embodiments the set of acceptable values for a score is the complete set of integers (both positive and negative). In other embodiments, the set of acceptable values for a score are all the real numbers (both positive and negative). Some examples of acceptable values determined as the score of one statement include "3", "0", "−14", "4.8", "0.2", and "−12.48".

The score can be calculated at different points in time, depending on the particular embodiment. In some embodiments, the score is computed each time a vote is received by the server 106. In another embodiment, the score is computed at the time it is needed to be displayed, used in another calculation, or presented in some other way on demand of the client 102.

In embodiments where the score is computed, there are several options for what computing device can be responsible for the computation of the score. In some embodiments, the calculation of the score is done on a server 106. In other embodiments, the computation of the score is handled by the computing device 100 of a client 102.

Scores are calculated for statements regarding an offering for the purpose of providing feedback to users, including users who have submitted statements 202 or have voted on statements 204. This feedback is provided by means of displaying the score 208 to the user.

In some embodiments, the score is displayed on the graphical interface of the client's 102 computing device 100. In one embodiment, the graphical interface is a web page that is rendered by an Internet browser on a computing device such as a desktop computer, laptop, or mobile device. In another embodiment, the graphical interface is rendered by software that resides on the client 102 that contains functionality that allows for the display of collaborative reviews over the network 104.

In some embodiments the score is displayed as a number. The number displayed can be any of number contained in the set of acceptable associated with the calculation of the score. These numbers can be both positive and negative real numbers and integers. In some embodiments, an indication of the sign (whether it be positive or negative) of the number is displayed along with the number. For example, the number "5" could be represented by the text "+5". In some embodiments, the numeric score calculated 206 is not the numeric score displayed to the user. The score displayed to the user may involve mathematical rounding, or other minor manipulations to that score, for means of making the score presentable. For example, the score "5.62" may be displayed as "6" or "+6". For example, in FIG. 4A score values of "+4" 405*a* and "−2" 405*b* are displayed to the user next to their associated statement. In some embodiments, the numeric value of the score is encoded as an abstract symbol or text before being displayed to the user. For example, a computed score of "5" could be displayed as "very good".

In some embodiments, the style of the score that is displayed reflects the nature of the score. In one of these embodiments, the color of the text used to display the score is dependent on whether or not the number is positive or negative. For example, FIG. 4A shows a positive score 405*a* displayed in a different color than a negative score 405*b*. In another one of these embodiments, the color and style of the text used to display the score is determined more specifically by the score. For example, the more positive a score is on the number line, the bolder the text could be used to represent the score. Alternatively, another example of this would be to use increasingly saturated colors to represent higher scores, that is, the color of the statement text intensifies according to the score of the statement.

In some embodiments, the computed score 206 for a statement is displayed to the user in an abstract way using graphical (non-numerical) methods. The graphical treatment of the statement is a reflection of the score that was computed. Examples of how the display of a statement could be altered include: coloring the background of the textual statement, coloring the text of the statement, changing the font of the textual statement, changing the size of the font of the textual statement, and changing the weight of the font for the textual statement. For example, in FIG. 4A the background element of a statement with a positive score 403*a* is a brighter color than that of another statement with a negative score 403*b*. This technique may or may not be employed in conjunction with displaying an explicit numerical representation of the score.

In some embodiments, the computed score 206 is used in determining the sort order of a collection of statements of one collaborative review. In one of these embodiments, statements with higher computed scores are displayed on the user interface in a more favorable position. By repeating the sorting process for all of the statements and their computed scores for a particular collaborative review, the end result is a sorted listed of statements. For example, if the statements are displayed in an Internet browser on the client's computing device 100, the statements with greater scores will be displayed higher on the page in a more favorable position. For example, in FIG. 4A statements 403 with a greater computed score 405 are positioned nearer to the top of the space reserved for the collaborative review. This implies that statements that are displayed first have a greater relative importance than statements that appear afterwards.

Expanding on the possibility of sorting statements based on their respective computed scores, in some embodiments, statements are segregated and grouped according to the categories assigned to them (eg. "Pro", "Con"). The segregated lists are then sorted independently from each other. This means, that all of the "Pro" statements will be sorted and displayed independently from the "Con" statements. For example, FIG. 4A shows two segregated lists of statements organized into "Pros" 402*a* and "Cons" 402*b* with individual statements 403 sorted amongst their respective lists.

In some embodiments, it is possible for a user to see a history of a collaborative review by looking at how other users have submitted statements and how they cast their votes. In some embodiments, the history of the collaborative review is presented as a table with statement submissions and votes displayed as rows with each row containing the date/time of the event, an indication of which user was responsible for the event, and what type of event it was. Types of events could be the submission of a statement or an indication of the vote whether it be to "agree" or "disagree". For example, FIG. 4B shows the history of a collaborative review as tabular data including the date/time, username, and what action they took. In some embodiments, a more specific history of the collaborative review can be seen by filtering the history on one or more users. This means that it would be possible to look at only a subset of the collaborative review history entries. For example, FIG. 4C shows a filtered history view of a collaborative review only looking at the actions taken by a user represented by the username "Reviewer".

In some embodiments, the computed score 206 is used to determine whether or not the statement is displayed on the client's 102 computing device. In one of these embodiments, the statements with scores falling below a threshold value will result in the statement being hidden from view on the client's display. For example, a statement has a computed score of "−6" that falls below a pre-determined threshold of "−1", resulting in that statement being hidden on the client's display. In some embodiments, the hidden statements can still be seen by a user initiated sequence in the interface. For example, a user is able to click on an interface element such as text, link, image, or button to reveal the hidden statement.

In some embodiments, the display of the computed score 208 is separated from the process of receiving statements 202 and casting votes regarding statements 204. Since the process of receiving statements and/or voting does not necessarily require the display of the computed score, the score may not be displayed. In one embodiment, the score is displayed to the user only when they are reading collaborative reviews, but not submitting statements or voting regarding statements for that collaborative review.

Figure 3:
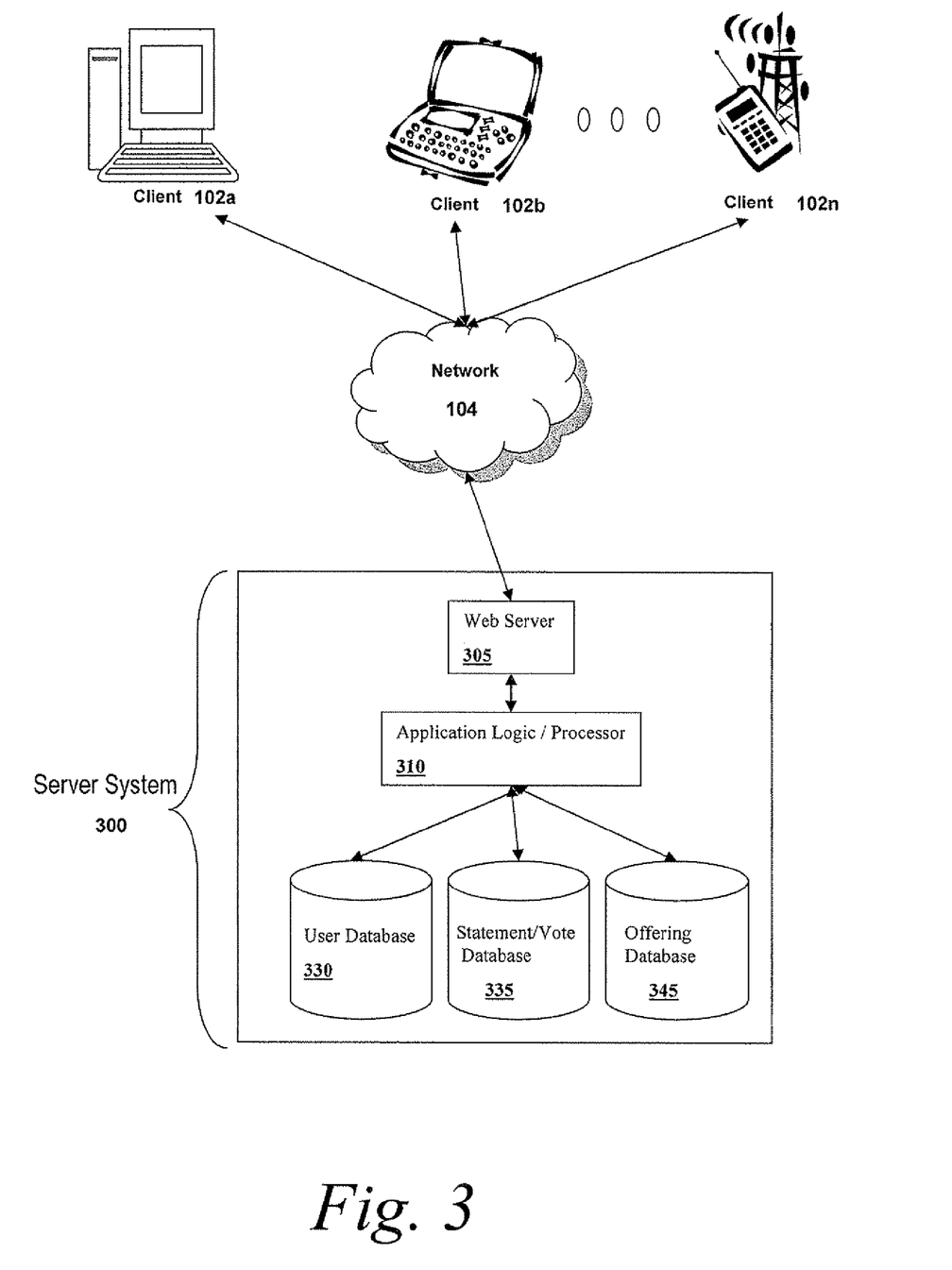
FIG. 3 is a block diagram of a system for creating and transmitting a collaborative review of an offering.

Referring now to FIG. 3, a server system 300 for storing, computing, and presenting the information of one or more collaborative reviews is shown. The server system is made up of several interacting components comprised of web servers 305, application logic processors 310, user databases 330, statement/vote databases 335, and offering databases 345. There may be one or more of each of these components set up in a logical way as to provide the means of creating collaborative reviews of offerings. In one embodiment, each of the interacting components may be on a separate physical machine. In other embodiments, one or more of the components may be on the same physical machine.

A Web Server 305 may interface with the network 104 and the application logic processor 310 for the purpose of interacting with one or more clients 102 to receive statements from users, receive votes from users, and display statements and scores to users. A Web server may provide the communication gateway to the user by responding to requests from the user and returning a response based on the data delivered from the application logic processor. In some embodiments, the Web Server is a single computer, and in other embodiments the Web Server is multiple computers working in a cluster. With web server clusters, each computer in the cluster may or may not exist on the same network. In some embodiments, the web server that handles an individual request is determined by a load balancing scheme in attempt to distribute the workload evenly over the different computers.

In some embodiments, the web server responds to requests made using the Hypertext Transfer Protocol (HTTP) and responds with messages to the client using Hypertext Markup Language (HTML) that is subsequently rendered as a visual interface by software residing on the client's computing platform. When receiving statements and/or votes, the information associated with the statement and/or vote is included in the request using the HTTP protocol. When displaying statements and votes, the information is presented as HTML and returned to the client using the HTTP protocol.

In some embodiments, the web server 305 is one or more computers running web server software that facilitates the exchange of information over the HTTP protocol. In these embodiments, the web server software is developed by a third party. Examples of web server software include Microsoft Internet Information Services (IIS), and Apache HTTP Server. In some embodiments, the web server software runs on a computer powered by a third party operating system (O/S). Examples of operating systems include Microsoft Server 2003, Microsoft Vista, Microsoft Windows XP, Linux, Unix, Ubuntu, and Mac OS X server. In some embodiments, the web server 305 requires a third-party web application platform, framework or language to handle requests and deliver client responses. Examples of web application platforms include Microsoft ASP.NET, Macromedia ColdFusion, Java Platform Enterprise Edition (Java EE, J2EE), PHP, and Ruby on Rails (Rails, RoR).

In some embodiments, the Web Server interacts with the client using the Asynchronous JavaScript and XML (AJAX) protocol. AJAX is compatible with the HTTP protocol and passes messages back and forth from the client to the Web Server using the Extensible Markup Language (XML) rather than HTML. In some embodiments, the XML data returned as a response to the client is then rendered by the client's browser software as HTML.

The web server 305 transmits data from user requests to the application logic processor 310 and receives data from the application logic processor to be relayed to the client as a response. In some embodiments the application logic processor exists on the same computer, and in other embodiments the application logic process exists on another computer. The application logic processor in this case may or may not exist in close proximity to the Web Server.

In some embodiments, the web server is responsible for determining the formatting of the information to be presented to the client in the response. The formatting of the information depends on the statement itself, the statement's score, the history of statement votes and submissions, and the state of the user's particular voting and submission history.

In some embodiments, an application logic processor 310 delivers data associated with the offering, statement, score, vote, user, and history to be included in the response to the client by the web server 305. In some embodiments, the application logic processor receives data associated with the offering, statement, vote, and user who initiated the request from the web server.

In some embodiments, a purpose of the application logic processor 310 is to tabulate, compute, and deliver data from each of the databases (user 330, statement/vote 335, and offering 345) in a logical form to the web server. In some embodiments, the application logic processor executes an algorithm to compile statements, executes an algorithm to compute each of the statements' associated scores, and executes an algorithm to retrieve the status of the user's votes on each of the statements. For example, when a user initiates a request for a particular collaborative review, the application logic processor seeks the necessary information from each of the databases on the server system 300, compiles the list of statements, computes the score for each statement, and determines the status of how the user has voted on that statement and delivers this information as a data structure to the web server.

In some embodiments, the algorithms, data inputs and outputs (I/O), data structures, logic, and computations done by the application logic processor are executed by software developed using one or more programming languages. Examples of programming languages include: C++, Visual Basic.NET (VB.NET), C#, PHP, and Java.

In some embodiments, a purpose of the application logic processor 310 is to facilitate information exchange from the web server 305 to each of the databases in a logical way as to record statement submissions, user votes, statement modifications, and statement deletions. For example, when a user submits a statement to be included in the collaborative review, the application logic processor receives the text of the statement from the web server 305 and initiates the inclusion of the text data in the statement vote database. The information associated with the user who submitted the statement is also included.

In some embodiments, the application logic processor 310 interacts with the database components using a computer database query language. An example of a computer database query language is Structured Query Language (SQL). SQL is a popular language used to create, retrieve, update and delete data from a database. In some embodiments, SQL statements (requests to the databases) may be constructed by the application logic processor as is required.

A server system may include several databases to function: the user database 330, the statement/vote database 335, and the offering database 345. In some embodiments, each of these databases exist as part of the same, larger database, and in other embodiments, these databases exist independent from each other. The databases may, without limitation, take the form of a file, relational database, or spreadsheet. In some embodiments, each of the databases is implemented as a relational database. In some embodiments the larger database that contains each of the constituent databases exists on one computer, and, in other embodiments, the larger database exists on multiple computers as part of a database cluster. Examples of relational databases include: MySQL, Microsoft SQL Server, Oracle database, and Microsoft Access. In some embodiments, the databases exist on one or more servers accessed over a network by a computer running the application logic processor, and, in other embodiments, the databases exist on the same physical machine as the application logic processor and is accessed directly.

The user database 330 may comprise any means of storing a list of users and associated data including, without limitation, a file, relational database, or spreadsheet. In some embodiments, the user database may be a separate physical machine from the web server 305 or application logic processor 310. In other embodiments, the user database may exist on the same physical machine. In some embodiments, the user database stores information about individual users of the server system. Examples of information that can be stored about each of the users includes: a unique identifier (UID), username, and password. The information of the user database serves to provide the information associated with the identity of each of the users of the system. In some embodiments, a user of the system may remain anonymous and not have a corresponding entry in the user database. In some embodiments, the information in the user database is related to the information of the statement/vote database as a means of record keeping as to which user submitted which statement or cast which vote. For example, if a particular user submits statements concerning several offerings, and votes on several statements, each of these statements and votes are associated with that user who submitted them by storing the UID of that user along with those statements and votes.

The statement/vote database 335 may comprise any means of storing a list of statements, votes and associated data including, without limitation, a file, relational database, or spreadsheet. In some embodiments, the statement/vote database may be a separate physical machine from the web server or application logic processor. In other embodiments, the statement/vote database may execute on the same physical machine.

In some embodiments, the statement/vote database stores statement information as records adhering to a schema. The statement data fields may include, without limitation, a unique identifier for the statement, a unique identifier corresponding to the user who submitted the statement, a unique identifier corresponding to the offering to which the statement refers, a text field storing the textual data of the statement, the date/time of the statement submission, and, optionally, a numeric score field that stores the current numeric score of the statement. In some embodiments, the numeric score field is omitted, and the score is calculated based on the information associated with the votes and users.

In some embodiments, the statement/vote database stores vote information as records adhering to a schema. The vote data fields may include, without limitation, a unique identifier for the vote, a unique identifier corresponding to the user who cast the vote, a unique identifier corresponding to the statement to which the vote refers, a field representing the nature of the vote (whether it be to "agree" or "disagree"), and the date/time of when the vote was cast. In some embodiments the field used to represent the vote is numeric with a value "−1" representing a "disagree" vote, and "1" representing a "agree" vote. In other embodiments, the field used to represent the nature of the vote is textual with the value of the text in some way indicating whether or not the vote was to "agree" or "disagree". In some embodiments, the value to represent the nature of a vote can be any one of the real or natural numbers. In some embodiments, the vote data contained in the statement/vote database may be used to compute the score at a later time, by the application logic processor 310.

An offerings database 345 may comprise any means of storing a list of offerings and associated data including, without limitation, a file, relational database, or spreadsheet. In some embodiments, the offerings database may be a separate physical machine from the web server 305 or application logic processor 310, in other embodiments, the offerings database may execute on the same physical machine. In some embodiments, the offering database 345 stores all of the necessary information associated with individual offerings used by the server system for the purpose of creating and displaying collaborative reviews or otherwise. The offerings database data fields may include, without limitation, a unique identifier for the offering, and a unique descriptive title for the offering. In some embodiments, other information to help identify the offering including, without limitation, price, description, and image data may be included in the offerings database. In some embodiments, some aspect of the information associated with each offering could be provided by a third-party. This information could be used to help identify the offering to a user to read and participate in the collaborative review of the offering.

Having described certain embodiments of methods and systems for creating a collaborative review of an offering, it will now become apparent to one of skill in the art that other embodiments incorporating the concepts of the invention may be used. Therefore, the invention should not be limited to certain embodiments, but rather should be limited only by the spirit and scope of the following claims.

We claim:

1. A method for creating a single collaborative review of a product or service offering, the method comprising:
 (a) receiving, by a web server, a first textual statement from a user directed to a first aspect of an offering, wherein the first textual statement is categorized by the user using a list of statement categories;
 (b) receiving, by the web server, a plurality of votes responsive to the first textual statement, each of the received votes comprising one of agree or disagree;
 (c) receiving, by the web server, a second textual statement from the user directed to a second aspect of the offering wherein the second textual statement is categorized by the user using the list of statement categories;
 (d) receiving, by the web server, a plurality of votes responsive to the second textual statement, each of the received votes comprising one of agree or disagree; and
 (e) calculating, by an application logic processor executing on the web server, an overall rating for the offering based on a score for the first textual statement, wherein the score for the first textual statement is calculated by summing the number of received agree votes and subtracting the sum of the number of disagree votes for the first textual statement, and a score for the second textual statement, wherein the score for the second textual statement is calculated by summing the number of received agree votes and subtracting the sum of the number of disagree votes for the second textual statement.

2. The method of claim 1, wherein the first textual statement is limited to a predetermined number of characters.

3. The method of claim 1, wherein step (b) comprises receiving, by the web server, the plurality of votes from a plurality of users responsive to the first textual statement, each of the received votes comprising one of agree or disagree.

4. The method of claim 1, wherein step (b) comprises receiving, by the web server, the plurality of votes from a plurality of users responsive to the first textual statement, each of the received votes comprising: (i) one of agree or disagree, and (ii) a comment.

5. The method of claim 4, further comprising displaying, by the web server, to a viewer, the first textual statement, a score calculated responsive to the first textual statement, the overall rating for the offering, and at least one of the comments received responsive to the first textual statement.

6. The method of claim 1, wherein step (e) comprises calculating, by the application logic processor, an overall rating for the offering using the score for the first textual statement and the score for the second textual statement.

7. The method of claim 1, wherein an indication of the score of the first textual statement comprises at least one of: a number, color, icon, font, font style, font size, or arrangement on a page.

8. A system for creating collaborative reviews of a product or service offering, the system comprising:
a web server which transmits a web page for
receiving a first textual statement from a user directed to a first aspect of an offering, and transmitting a web page for receiving a plurality of votes responsive to the first textual statement, wherein the first textual statement is categorized by the user using a list of statement categories; and
receiving a second textual statement from the user directed to a second aspect of the offering, and transmitting the web page for receiving a plurality of votes responsive to the second textual statement, wherein the second textual statement is categorized by the user using the list of statement categories;
a database, in communication with the web server, which stores the first textual statement and the plurality of votes responsive to the first textual statement and the second textual statement and the plurality of votes responsive to the second textual statement in a memory element, each of the plurality of votes responsive to the first textual statement and the second textual statement comprising one of agree or disagree; and
an application logic processor, in communication with the database, which creates a score for the first textual statement based on the plurality of votes responsive to the first textual statement, wherein the score for the first textual statement is created by summing the number of agree votes and subtracting the sum of the number of disagree votes for the first textual statement, and a score for the second textual statement based on the plurality of votes responsive to the second textual statement, wherein the score for the second textual statement is created by summing the number of agree votes and subtracting the sum of the number of disagree votes for the second textual statement, and creates an overall rating based on the score of the first textual statement and the score of the second textual statement.

9. A system for creating a single collaborative review of a product or service offering, the system comprising:
a means for receiving, by a web server, a first textual statement from a user directed to a first aspect of an offering, wherein the first textual statement is categorized by the user using a list of statement categories;
a means for receiving, by the web server, a plurality of votes responsive to the first textual statement, each of the received votes comprising one of agree or disagree;
a means for receiving, by the web server, a second textual statement from the user directed to a second aspect of the offering, wherein the second textual statement is categorized by the user using the list of statement categories;
a means for receiving, by the web server, a plurality of votes responsive to the second textual statement, each of the received votes comprising one of agree or disagree; and
a means for calculating, by an application logic processor executing on the web server, an overall rating for the offering based on a score of the plurality of votes for the first textual statement, wherein the score for the first textual statement is calculated by summing the number of received agree votes and subtracting the sum of the number of disagree votes for the first textual statement, and a score of the plurality of votes for the second textual statement, wherein the score for the second textual statement is calculated by summing the number of received agree votes and subtracting the sum of the number of disagree votes for the second textual statement.

10. The system of claim 9, further comprising wherein the first textual statement is limited to a predetermined number of characters.

11. The system of claim 9, further comprising means for receiving, by the web server, the plurality of votes from a plurality of users responsive to the first textual statement, each of the received votes comprising: (i) one of agree or disagree, and (ii) a comment.

12. The system of claim 11, further comprising means for displaying, by the web server, to a viewer the first textual statement, a score calculated responsive to the first textual statement, the overall rating for the offering, and at least one of the comments received responsive to the first textual statement.

13. The system of claim 9, further comprising means for calculating, by the application logic processor, an overall rating for the offering using the score for the first textual statement and the score for the second textual statement.

14. The system of claim 9, wherein an indication of the score of the first textual statement comprises at least one of: a number, color, icon, font, font style, font size, or arrangement on a page.

* * * * *